United States Patent
Patel et al.

(10) Patent No.: US 7,596,484 B1
(45) Date of Patent: Sep. 29, 2009

(54) NETWORK NODE EMULATOR AND METHOD OF NODE EMULATION

(75) Inventors: Amit J. Patel, Jersey City, NJ (US); Neil K. Salant, Rockaway, NJ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 967 days.

(21) Appl. No.: 09/711,898

(22) Filed: Nov. 15, 2000

(51) Int. Cl.
*G06F 9/455* (2006.01)
*G06F 15/173* (2006.01)

(52) U.S. Cl. .................. 703/26; 709/223; 702/182; 702/186

(58) Field of Classification Search ............... 703/26; 709/223; 702/182, 186
See application file for complete search history.

(56) References Cited

U.S. PATENT DOCUMENTS

| | | | |
|---|---|---|---|
| 4,736,320 A | 4/1988 | Bristol | |
| 5,045,994 A | 9/1991 | Belfer et al. | |
| 5,303,166 A | 4/1994 | Amalfitano et al. | |
| 5,355,496 A | 10/1994 | Fant et al. | |
| 5,440,697 A | 8/1995 | Boegel et al. | |
| 5,732,213 A | 3/1998 | Gessel et al. | |
| 5,774,695 A * | 6/1998 | Autrey et al. | 703/26 |
| 5,796,633 A | 8/1998 | Burgess et al. | |
| 5,809,250 A | 9/1998 | Kisor | |
| 5,812,780 A | 9/1998 | Chen et al. | |
| 5,822,520 A * | 10/1998 | Parker | 709/230 |
| 5,835,726 A | 11/1998 | Shwed et al. | |
| 5,889,954 A * | 3/1999 | Gessel et al. | 709/223 |
| 5,907,696 A | 5/1999 | Stilwell et al. | |
| 5,974,572 A | 10/1999 | Weinberg et al. | |
| 6,035,264 A * | 3/2000 | Donaldson et al. | 702/182 |
| 6,074,427 A | 6/2000 | Fought et al. | |
| 6,295,518 B1 * | 9/2001 | McLain et al. | 703/23 |
| 6,330,587 B1 * | 12/2001 | Tedone et al. | 709/201 |
| 6,532,237 B1 * | 3/2003 | Or et al. | 370/396 |
| 6,549,882 B1 * | 4/2003 | Chen et al. | 703/21 |
| 6,772,107 B1 * | 8/2004 | La Cascia et al. | 703/21 |
| 6,832,184 B1 * | 12/2004 | Bleier et al. | 703/23 |
| 6,922,663 B1 * | 7/2005 | Maurer | 703/13 |

OTHER PUBLICATIONS

Rob Simmonds, Russell Bradford, "Applying Parallel Discrete Event Simulation to Network Emulation" IEEE 2000, pp. 15-22.*
Frohnhoff B. et al: "An Advanced TMN Test System—TSE-P-" 1996 IEEE Network Operations and Management Symposium, vol. 2 SYMP 5, Apr. 15, 1996, pp. 444-453, XP000634809.

* cited by examiner

*Primary Examiner*—Paul L. Rodriguez
*Assistant Examiner*—Dwin M. Craig
(74) *Attorney, Agent, or Firm*—Edell, Shapiro & Finnan, LLC

(57) ABSTRACT

A method and apparatus is provided for network node emulation, including a node emulator, comprising a node interface, a memory, and a CPU. A method of generating an emulated network node includes the steps of generating an emulation script using a network node emulation language and operating a computer device according to the emulation script in order to transmit and receive data packets in the computer device. The method comprises receiving an incoming message, transmitting an outgoing message, and recognizing a response requirement in the incoming message. The method comprises responding to the incoming message by transmitting a response outgoing message if the incoming message includes a response requirement.

42 Claims, 5 Drawing Sheets

TCP HEADER

NETWORK NODE EMULATOR AND METHOD OF NODE EMULATION

BACKGROUND OF THE INVENTION

1. Field of the Invention

The present invention relates generally to network node emulation, and more particularly to emulation of network node behavior.

2. Description of the Background Art

Computer networks have become widespread and ubiquitous. They are commonly used for data storage and manipulation, communications, commerce, information procurement, etc. By connecting together (networking) multiple computers or multiple computer networks, information may be easily shared, and shared in an almost instantaneous fashion.

FIG. 1 shows a typical distributed electronic network 115 connecting two or more nodes, such as node A and node B as shown. The distributed electronic network 115 may be, for example, the Internet. A network node is a computer or computer device that is connected to the network and communicates over the network 115. A computer network may contain many such nodes, including computers, workstations, servers, routers, gateways, switches, etc. A node therefore may be any device on the network 115 capable of transmitting and/or receiving data.

Data traveling on a computer network, such as over the Internet, for example, is typically in the form of a packet. Data in a data transmission is usually broken down into packets that are individually transmitted. A receiving device reassembles the data transmission when all of the packets have been received. The packets may pass through multiple networks and multiple network routers or gateways when traveling from one node to another.

FIG. 2 shows a packet 125 according to the TCP protocol. The packet 125 includes a source port 205 (i.e., a source address) and a destination port 210 (i.e., a destination address). By using the source and destination address, in conjunction with physical layer headers, a network device receiving the packet 125 may be able to determine whether to accept the packet, whether to pass the packet on to another device, or whether to ignore the packet. Additional information on packet structure and packet communication may be found in Douglas Corner, *Internetworking with TCP/IP Volume 1 Principles, Protocols, and Architecture,* 3rd Ed., Prentice-Hall, Englewood Cliffs, N.J., 1995, incorporated herein by reference.

One of the most significant challenges that exists in designing a new network node, a new network protocol, a new node software, etc., is in testing. Developers, manufacturers, distributors, users, etc., want to be sure that the product works properly and without causing problems for a target network and for nodes on the target network. Alternatively, an existing, functioning node may need to be tested to ensure proper operation or to ensure the ability to handle a desired level and type of data traffic.

The Internet, along with many other networks, employs the Transport Control Protocol/Internet Protocol (TCP/IP). TCP/IP dictates a standard software protocol and a standard transmission protocol, allowing interconnected networks to communicate. TCP/IP also dictates a standard reception protocol. TCP/IP based data networks are a unique grouping of network elements or nodes that adhere to the TCP/IP protocol in order to communicate. Such networks include many nodes, with the nodes being connected by an underlying network infrastructure. The network infrastructure may participate in basic communications between nodes.

In order to test software that operates the underlying network infrastructure, a test bed of network nodes may be employed, including real world nodes. These real world nodes must emulate day-to-day behavior in a controlled manner that allows a tester to accurately script reproducible behavior. The tester must also be able to script ad hoc behavior in order to stimulate nondeterministic (i.e., irregular or unpredictable) functionality.

The temporal characteristics of a network are rather difficult to capture due to their stochastic nature, but a functional breakdown shows that the most common compositional behavior is a regular transmission action and a pseudoregular reception action (pseudo because it is stimulated by a transmission from another node). The transmission action usually occurs with some periodicity, typically to output data. The reception action typically is a combination of a packet processing that results in some predetermined node application behavior and/or a packet processing that results in a protocol interaction behavior.

In the prior art, emulation or testing of node behavior has traditionally been done by directing manually formatted or pre-formatted packet traffic at a node. The data content is typically fixed. For example, the Internet Control Message Protocol (ICMP) may be used in troubleshooting network connectivity. It is accessible via simple network utilities like "ping" that periodically send out to a specified address. This is done manually by a user via a console.

Alternatively, using a traffic generation tool, a technician or operator may create or select test messages to be transmitted to a node under test. The drawbacks of this are the time and effort required, relatively large time gaps between messages, and the inability to fully emulate regular network traffic.

Immersing a node into an existing network is another way in which the node may be tested. An actual network environment may offer realistic message traffic loads, traffic types, and response times. However, it may not offer a tester the opportunity or ability to supplement the on-going message traffic and stretch the test environment beyond normal traffic levels and traffic types.

Real life testing may alternatively be done by creating a network test bed with multiple linked computers. However, this is expensive and time-consuming.

Testing has been performed through the use of specification languages that can be used in a computer device to create a test environment. Specification languages exist in the prior art for the purpose of describing and filtering packets. Some of the prior art specification languages are concerned with multiplexing/de-multiplexing and transmitting/receiving operations using a protocol stack. These operations are internal to the operation of the TCP/IP protocol and are not specific to host operations. The prior art specification languages allow fixed-time transmission and reception of packets because these languages are for synchronous programming of reactive systems. However, the specification languages of the prior art are more concerned with building type systems to represent packet structures with different degrees of refinement as part of a packet filter.

One example of a specification language is discussed in "Packet Types" by Satish Chandra and Peter J. McCann, Second Workshop on Compiler Support for Systems Software (WCSSS), May 1999, available on the world-wide web at "http://www.bell-labs.com/user/schandra/pubs.html".

No device currently exists to fully emulate the behavior of a network node and to fully emulate the composition of network traffic. The prior art approaches are lacking in terms of automation, language specification, approximation of dynamic node behavior, and linkage to time scales. The prior art approaches are also lacking in an ability to individually address or characterize different aspects and attributes of the TCP/IP protocol. In addition, the prior art approaches do not have a central integration of TCP/IP functionality, are not independent of platform and operating systems, are not expandable to accommodate new protocols, and cannot specify data contents of generated transmit messages. The prior art includes no accommodation of data protocol specifications. More importantly, the approaches of the prior art are inadequate because they are merely reactive or filter-based. Fixed-time packet transmission and reception is inadequate to fully emulate interactive node behavior.

Therefore, the prior art tests only the bigger, more likely points of failure and emulates only simple node behaviors. Common test apparatus and procedures perform some tests of capacity, but only overall capacity and not capacity at the level of individual packets. In addition, the prior art approaches require specialized or additional hardware, and may not accommodate insertion of a node or node emulator into a real world network.

What is needed, therefore, is an improved instrumentality for network node emulation.

SUMMARY OF THE INVENTION

A node emulator for conducting interactions with at least one network node is provided according to a first aspect of the invention. The node emulator comprises a network interface capable of transmitting and receiving packets over a distributed electronic network over which the at least one network node and the node emulator communicate. The node emulator further comprises a memory, the memory being capable of storing a network protocol information, storing a node emulator hardware configuration, storing a network hardware configuration, storing network addresses, storing payloads, storing transmit times of outgoing messages, storing outgoing message repetitions, storing outgoing message repetition times, storing outgoing message transmission periods, storing receive triggers, storing response destination addresses, and storing an emulation script. The node emulator further comprises a CPU, the CPU being capable of controlling the node emulator to receive an incoming message, to transmit an outgoing message, and to recognize a response requirement in the incoming message and respond to the incoming message by transmitting a response outgoing message if the emulated incoming message includes a response requirement. The node emulator is capable of specifying a predetermined set of interactions to be experienced by the at least one network node as a result of engaging in a packet exchange between the at least one network node and the node emulator, specifying protocol characteristics of a packet exchange, and specifying node interactions necessary to exchange packets. The node emulator is capable of employing the emulation script to conduct interactions with the at least one network node.

A computer-implemented method of generating an emulated network node in a distributed electronic network is provided according to a second aspect of the invention. The method comprises the steps of receiving an incoming message at the emulated network node and transmitting an outgoing message from the emulated network node. The method further comprises a step of recognizing a response requirement in the incoming message and responding to the incoming message by transmitting a response outgoing message if the incoming message includes a response requirement. Therefore, an emulation script is used to determine behavior of the emulated network node.

A computer-implemented method of generating an emulated network node is provided according to a third aspect of the invention. The method comprises the steps of generating an emulation script using a network node emulation language and operating a computer device according to the emulation script in order to transmit and receive data packets in the computer device. Therefore the computer device is capable of operating to receive an incoming message, transmit an outgoing message, and recognize a response requirement in the incoming message and responding to the incoming message by transmitting a response outgoing message if the incoming message includes a response requirement.

A computer-implemented method of generating emulated communication between at least one network node and a node emulator is provided according to a fourth aspect of the invention. The method comprises a step of specifying a predetermined set of interactions to be experienced by the at least one network node as a result of engaging in a packet exchange with the node emulator. The method further comprises a step of specifying protocol characteristics of the packet exchange. The method further comprises a step of specifying node interactions necessary to exchange packets between the at least one network node and the node emulator. Therefore an emulation language specifies the predetermined set of interactions, the protocol characteristics, and the node interactions, and is used to script behavior of the node emulator.

A computer-implemented method of providing a network node emulation language capable of generating an emulation script for emulating a network node is provided according to a fifth aspect of the invention. The method comprises a step of providing a transmit command capable of generating and transmitting an outgoing network message. The method further comprises a step of providing a receive command capable of receiving an incoming network message. The method further comprises a step of providing a response command capable of recognizing a response requirement in the incoming message and responding to the incoming message by transmitting a response outgoing message if the incoming message includes a response requirement.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 3:
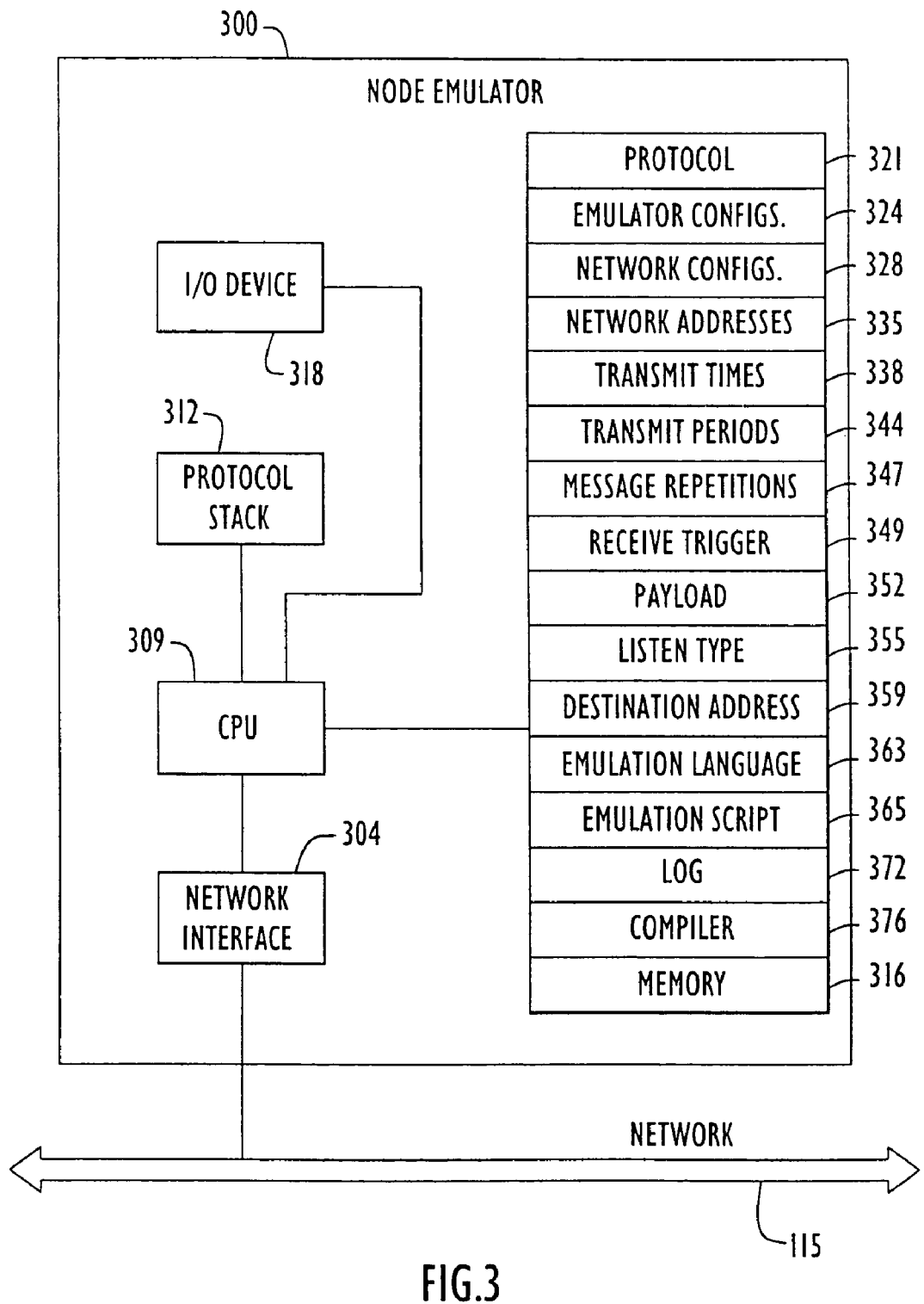
FIG. 3 shows one embodiment of a node emulator according to the invention.

FIG. 3 shows one embodiment of a node emulator 300 according to the invention. The node emulator 300 may be connected to a network 115. The network 115 may be any type of distributed electronic network, including, for example, a Local Area Network (LAN), a Wide Area Network (WAN), a Virtual Private Network (VPN), or the Internet. The node emulator 300 may include a network interface 304, a CPU 309, a protocol stack 312, and a memory 316. In addition, the node emulator 300 may include one or more I/O devices 318.

The network interface 304 may be any sort of interface that allows communication over the network 115. This may be, for example, a network card such as that commonly found in computers, a modem or telephony card, serial ports, etc.

The CPU 309 may be any type of general purpose CPU.

The protocol stack 312 is a data construct used to specify how network communications are performed. A protocol is an established set of procedures and standards used by a computer or computer device in order to communicate over a network with other such devices. Common protocols are TCP, IP, the User Datagram Protocol (UDP), the Open Systems Interconnection (OSI) protocol, etc. A protocol stack (or suite) is made up of multiple protocols (sometimes termed layers) used to exchange information between computers. One protocol in the stack might be used to specify how a network interface card communicates, while another might specify how a computer reads information from the network interface card.

It should be understood that although the protocol stack 312 is shown as a separate element, alternatively it may be implemented in the memory 316.

The memory 316 is used to store data, program instructions, working values, etc., in order that the node emulator 300 may emulate a network node. The memory 316 may be any type of storage device, including Random Access Memory (RAM), Read-Only Memory (ROM), magnetic tape or disc, bubble memory, optical memory, etc.

The memory 316 may include a protocol storage 321, an emulator configuration storage 324, a network configuration storage 328, a network address storage 335, a transmit time storage 338, a transmit periods storage 344, a message repetitions storage 347, a receive trigger storage 349, a payload storage 352, a listen type storage 355, a response destination address storage 359, an emulation language storage 363, an emulation script storage 365, a log storage 372, and an emulation language compiler 376.

The protocol storage 321 may store any required or optional protocol information used by the node emulator 300 to communicate over the network 115. The protocol storage 321 may therefore store a plurality of protocols.

The emulator configuration storage 324 may store any hardware configurations of the node emulator 300, including, for example, a node emulator address, network interface configurations (i.e., serial ports, parallel ports, interface cards, etc.), operating system configurations, protocol stack configurations, transmission speeds, and others.

The network configuration storage 328 may store network hardware and software configurations including, for example, packet characteristic descriptions (such as type of service, precedence, etc.), a source port or ports, network addresses of other nodes, network protocol information, destination ports, etc.

Using the configuration data, the invention may emulate one or more addresses and one or more ports in the node emulator 300.

The network address storage 335 may store, for example, non-existent network addresses used to simulate non-existent nodes (i.e., virtual nodes).

The transmit time storage 338 may store one or more transmit times for outgoing packets transmitted by the node emulator 300.

The transmit periods storage 344 may store one or more time periods between repetitions for a periodic outgoing message. The time periods may be fixed or pseudo random, varying between minimum and maximum values.

The message repetitions storage 347 may store one or more numbers of repetitions of a periodic outgoing message.

The receive trigger storage 349 may store information needed to implement one or more receive trigger actions. This information may include, for example, a source port, a packet protocol type, a payload data, and an incoming source IP address.

The payload storage 352 may store one or more payloads to compare to a received payload in an incoming packet. In addition, the payload may be data contained within the data portion of a packet to be transmitted.

The listen type storage 355 may store one or more listen types (i.e., UDP, TCP, etc.) to compare to a type of an incoming packet. The only required data for a listen is a destination address (i.e., the address of a node receiving or listening to a packet). The listen can therefore receive any and all incoming packets. A listen event may also include a matching criterion for specifying protocol types to compare to incoming packet protocol types.

More generally, listen events may be used to configure the protocol stack to allow incoming packets to be received by specific protocols, using specific network protocols.

The destination address storage 359 may store one or more destination addresses. The destination address storage 359 may be used to send outgoing messages. In addition, the destination address storage 359 may also store one or more destination port numbers.

It should be noted that the above memory organization and utilization is illustrative and not exhaustive. Other memory configurations may be employed, such as, for example, a compiled emulation script storage that replaces items 321–359 with one compiled emulation script file containing all needed data or configurations employing a combination of items.

The emulation language storage 363 may store an emulation language grammar, and additionally may store examples, instructions, etc.

An emulation script 365 may be a previously constructed and stored emulation script that may be used to generate a emulated network node (such as a compiled emulation script 365 that configures and controls the hardware of the node emulator 300).

A log 372 may be a record of node transactions, and may record all events or operations performed by the node emulator 300. In addition, the log 372 may also record packets received from other nodes and may record packets sent to other nodes.

The emulation language compiler 376 may be used to compile an emulation script 365 in order to convert the emulation script from a human-readable form into a machine-readable form (i.e., an executable set of instructions and data).

In operation, a human operator may use the one or more I/O devices 318 to generate or activate one or more emulation scripts 365. The emulation script 365 may be stored in the memory 316, and may be executed by the CPU 309. The CPU 309 controls all transmission or reception events over the network 115 using the network interface 304 and the protocol stack 312. The CPU 309 accesses the memory 316 in order to retrieve the emulation script 365 and any of the stored variables. Therefore, a stored emulation script 365 may be retrieved and executed by the CPU 309 to transmit and receive packets over the network 115.

In addition, the node emulator 300 may be manually operated by an operator who can access and use the emulation language 363 to generate commands which the CPU 309 can implement. For example, a manual operator could generate and transmit a message or data packet over the network 115.

Figure 1:
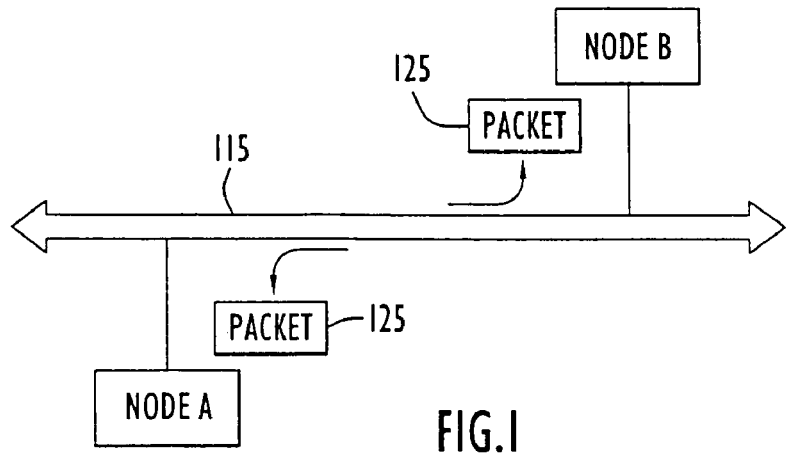
FIG. 1 shows a typical distributed electronic network connecting two or more nodes.
Figure 2:
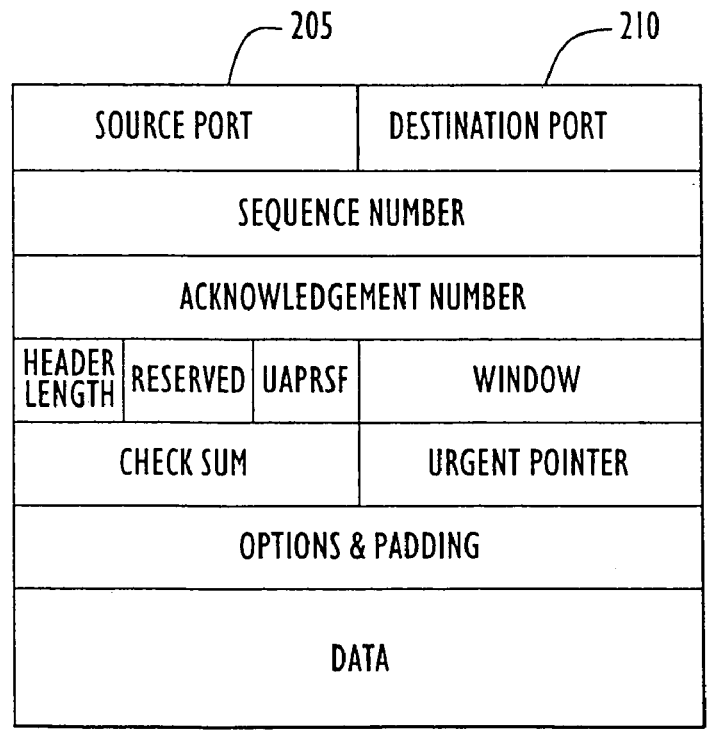
FIG. 2 shows a packet according to the TCP protocol.

The node emulator 300 may be connected to another network node, as shown in FIG. 1, or may be connected to an existing network.

Figure 4:
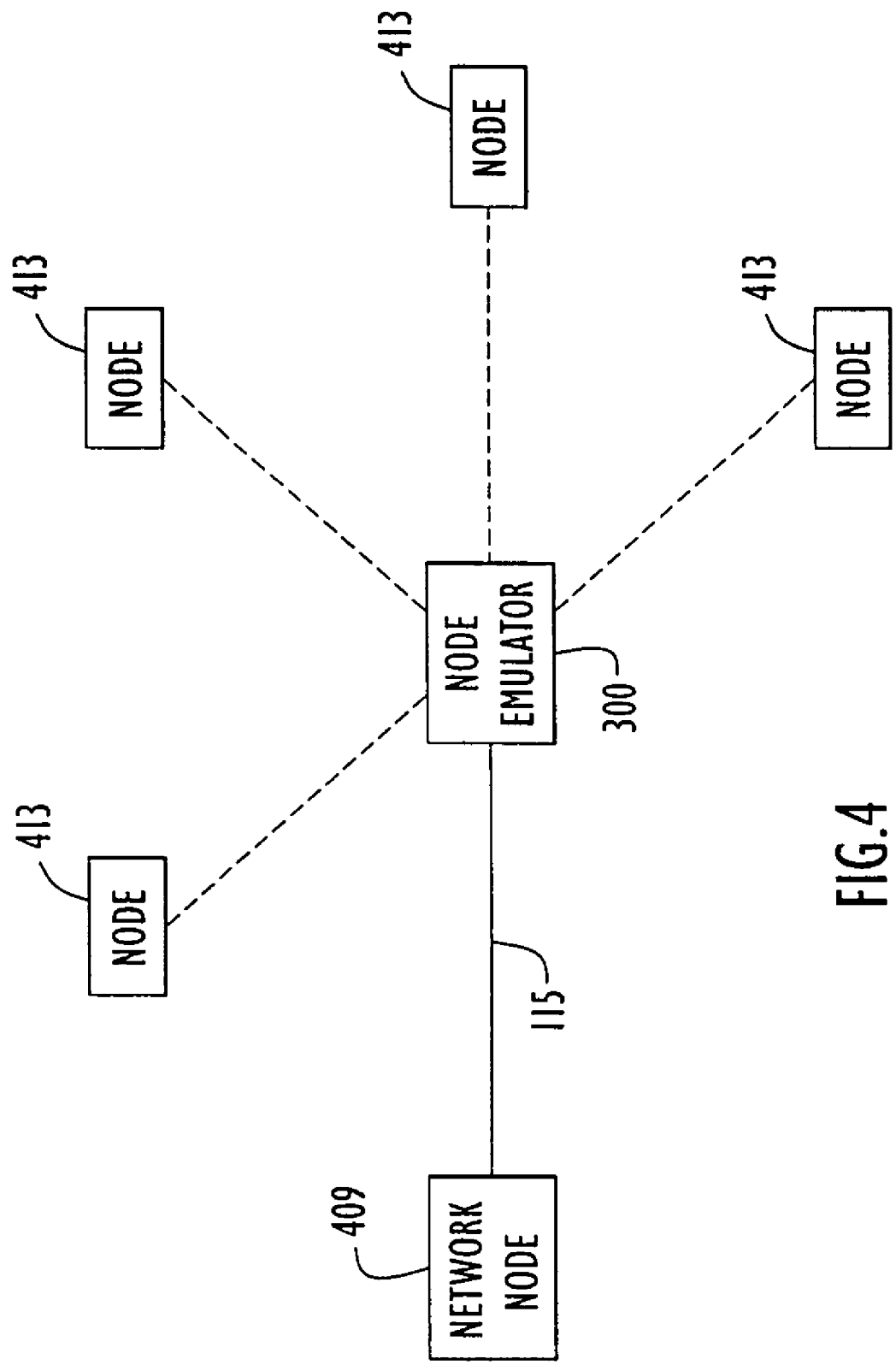
FIG. 4 shows one embodiment of a node emulation configuration using the node emulator according to the present invention.

FIG. 4 shows one node emulation configuration using the node emulator 300 according to the present invention. In the configuration shown, the node emulator 300 is connected to a network node 409 that is being tested in some manner. The node emulator 300 may be used to send packets to and receive packets from the network node 409 in order to test the network node 409 or to emulate a network environment. This may include emulating different types of network conditions, such as heavy traffic or specific traffic types.

In an additional capability, the node emulator 300 may more fully emulate a network environment by creating virtual nodes 413. This may be done by transmitting packets containing non-existent source addresses. In addition, the node emulator 300 may receive messages intended for these virtual nodes 413 and generate response outgoing packets, further emulating network behavior by making the virtual nodes 413 reactive to packets from the network node 409. Furthermore, virtual nodes may more fully emulate network behavior by autonomously transmitting packets, in the manner specified in the emulation script.

The node emulator 300 may therefore create a plurality of virtual nodes 413 to interact with the network node 409. An advantage of this is that the node emulator 300 can quickly, easily, and economically emulate a network environment. The node emulator 300 may obviate the need to purchase multiple network devices, along with their attendant cabling, power consumption, and setup and maintenance overhead.

In existing network configurations (not shown), the node emulator 300 may be connected into the existing network, and the node emulator 300 may inject packets into the existing network in order to interact with some or all of the nodes.

Figure 5:
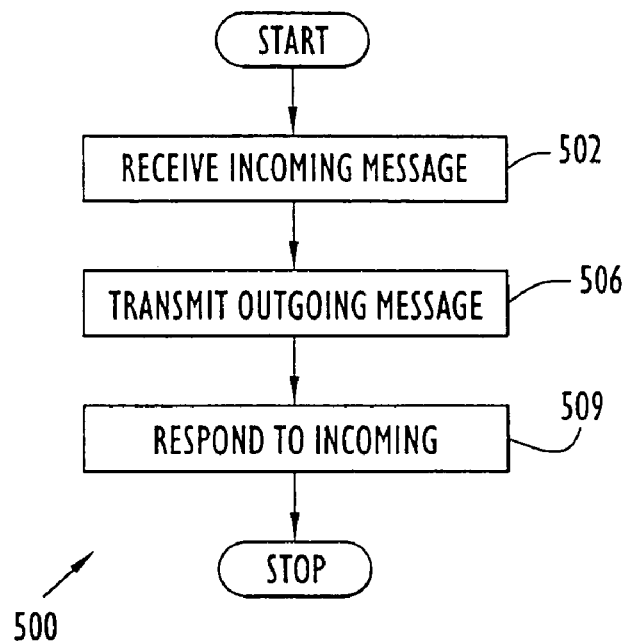
FIG. 5 shows a flow chart of a method of node message transmission according to the invention.

FIG. 5 shows a flow chart 500 of a method of conducting message communication according to the invention. In step 502, the node receives an incoming message from the network (i.e., a listen event). In a most basic form, the receive command allows packets to be received at an emulator node, provided they are addressed to some listening destination port and no other condition is specified for the listen event (except possibly a protocol type such as a UDP/TCP/multicast protocol or an embedded protocol). For example, the receive command may specify receipt from a particular node or nodes. In addition, the receive command may specify data or a regular expression in the message or data packet that must be matched. For example, the receive command may specify that an incoming message be received if a text string in the incoming packet matches a predetermined text string. In the case of a regular expression, a received payload may be evaluated with a regular expression. The evaluation may generate a true or false result. If the result is true, then the received payload had enough components that matched according to the rules of regular expressions to result in a true match.

It should be understood that although packet transmission and reception is discussed, the emulator and emulation method of the invention may conduct communications without necessarily involving packets. The invention may avoid using packets by communicating with a protocol transport layer that is independent of the packet structure via encapsulation. The invention may do this by specifying a particular transport protocol layer. For example, in a TCP/IP protocol communication session, the messages may be transmitted via protocol layer 6 instead of protocol layer 4.

In step 506, the node may transmit an outgoing message. As in the receive function, a transmit command may be used to send a packet to a specific destination or destinations. The destination may be a node in an actual network or may be a solitary node that is only connected to the node emulator in order to emulate a network.

The transmit command may specify that a message be sent at a specific time. In addition, the message may be repeated, with the number of repetitions and an interval period between message repetitions being specified in the transmit command. In addition, a payload, packet characteristics, and source and destination ports may be specified.

The interval period between repetitions may be fixed or variable. For example, predetermined values for the interval period may be specified, or the repetitions may be transmitted at pseudo random times (i.e., sent anywhere between minimum and maximum time period values). This may be done in order to better emulate real node behavior.

In step 509, the node may respond to an incoming message by transmitting a response outgoing packet. For example, an incoming message may need a responsive reply (the two nodes have some form of interaction occurring, with the interaction abiding by a peer-to-peer relationship but not restricted to any particular corresponding layer of communication). A response outgoing packet may be enabled and configured by a response command. The response command may specify a source address of the incoming message and may specify a destination address or addresses of the outgoing response message. In addition, a payload and packet characteristics may be specified. The response command may also specify a data payload. When an incoming message meets the criteria specified in the response command, a response outgoing packet is transmitted according to the response command. Additionally, the source port number and the packet protocol type can also be used to match and trigger a response. Furthermore, the response command may evaluate a payload in an incoming message with a predetermined regular expression and transmit a response outgoing message if the payload is evaluated with the predetermined regular expression to match true.

An additional capability of the invention is event triggering, where the execution of a particular event triggers another event and not necessarily a data transmission or reception. The event triggering capability may include event triggered events. This adds the ability to exercise actual functionality when an event from the event set occurs. For example, a bind mechanism may bind an actual function to an event, with the function being capable of executing a unique and independent behavior that falls into the category of being triggered by "time" or "rcv from" functionality. The event triggering gives a flexibility to specify event actions that are simply the result of normal event operations.

It should be noted that although the steps of FIG. 5 are shown as a simple sequence, the receive, transmit, and response actions may occur at any time and may occur independently of each other. A node emulator according to the invention may be transmitting a message or packet while also receiving or responding to a message or packet. In addition, each action may occur an indefinite number of times, and not merely once.

It should also be noted that the response function is separate and independent from the receive function. A first incoming message or packet may be received while an emulator according to the invention is responding to a second incoming message. Alternatively, a receive command in an emulation script may respond to the same incoming message that the emulator is receiving.

In addition to the receive, transmit, and response capabilities described above, the emulator and emulation method according to the invention may also perform preprocessing and postprocessing functions for each event. This allows for the manipulation of data before and/or after transmission or reception, reflecting a standard protocol stack capability.

In a further advantageous capability of the invention, a group of emulated nodes may be named by specifying a group master and group members. Therefore, in order to send a message to the group master, the group members, or all nodes in the group, the invention allows a message to be addressed to the group. A single node may be considered a master, for example, if it employs a "poll and select" mechanism used to conduct round-robin transmissions to or from a subset of network nodes. In addition, a generic network grouping can be used to increase an addressing capability, allowing a node to refer to a subset of nodes in some relative fashion, independent of IP subnetting strategies.

Figure 6:
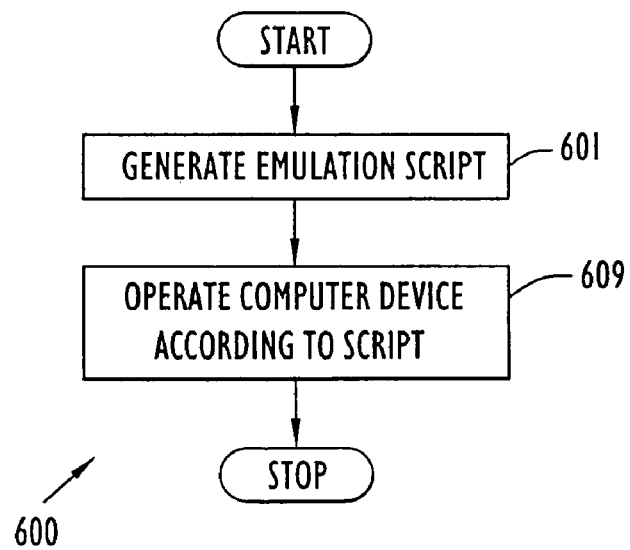
FIG. 6 shows a flow chart of a method of controlling node operation according to the invention.

FIG. 6 shows a flow chart 600 of a method of controlling node device operation according to the invention. In step 601 an emulation script is generated. The emulation script may contain one or more commands of the emulation language. The commands may be used, for example, to receive an incoming message, to transmit an outgoing message, or to respond to an incoming message. The emulation script, therefore, is a listing of actions to be performed by a node emulator. The emulation script requires compilation before it can be executed by a computer device.

In step 609, a computer device is operated according to the emulation script. The computer device may be a node emulator or part of a node emulator. Alternatively, the computer device may be a network node or a network node component. The computer device operates according to the emulation script. The emulation script therefore comprises computer software used to operate the computer device in a particular manner in order to emulate a network node. The emulation includes sending packets, receiving packets, and responding to received packets. The emulation script therefore is a preprogrammed listing of events and possible events.

Figure 7:
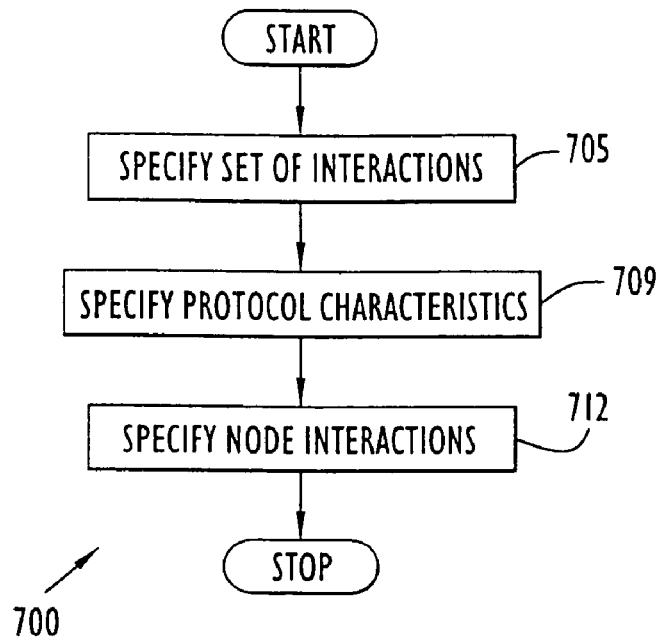
FIG. 7 shows a flow chart of a method of controlling node interaction according to the invention.

FIG. 7 shows a flow chart 700 of a method of node interaction according to the invention. In step 705, the method specifies a set of interactions to be experienced by a network node as a result of engaging in a packet exchange with the node emulator. The set of interactions may include, for example, an outgoing message or a periodic outgoing message transmitted by the node emulator to at least one network node.

The predetermined set of interactions also includes an incoming message received by the node emulator from at least one network node.

In step 709, the emulator specifies protocol characteristics. The protocol characteristics may include, for example, a TCP protocol, UDP, IP, IPX, a type of service, precedence, etc.

In step 712, the emulator specifies node interactions. The node interactions may include, for example, a response outgoing message transmitted in response to an incoming message. Furthermore, the node interactions may include comparing a source IP address in an incoming message to a predetermined address or set of source addresses. A response outgoing message may be transmitted if there is a match. Therefore, the node emulator may respond to a message from a specific network address, for example. In this manner, the network traffic may be emulated in a highly specific manner. In addition, the response outgoing message may be directed at multiple destinations, and for a repetition number of times. Furthermore, the time period between the repetitions may be a pseudo random time period, with each repetition varying between minimum and a maximum values. Alternatively, the time interval between repetitions may be specified. In addition, the node emulator may model web traffic behavior by having minimal data uploads in conjunction with large downloads, as is the case with real world data traffic.

Figure 8:
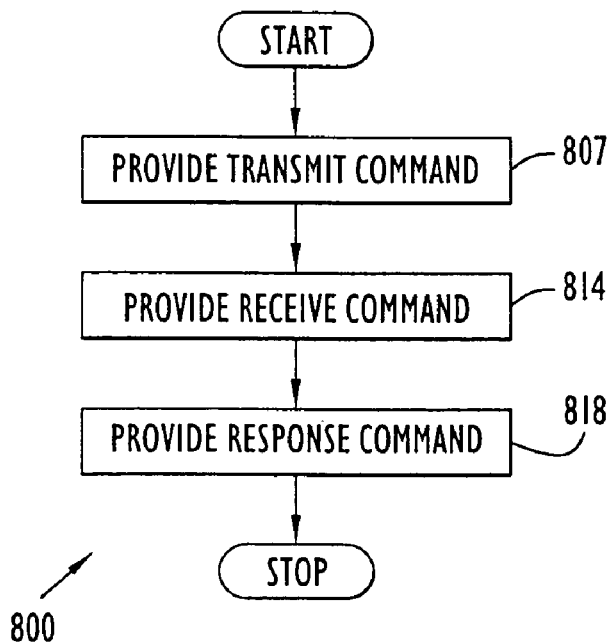
FIG. 8 shows a flow chart of a method controlling node command response according to the invention.

FIG. 8 shows a flow chart 800 of a method of monitoring command response performance according to the invention. In step 807, the method provides a transmit command ("trigger time"). The transmit command is capable of generating and transmitting an outgoing message from the node emulator to at least one destination node. The message contents may be specified by the transmit command. In addition, the transmit command may send one or more outgoing messages and may specify the start time of a transmission, the number of repetitions, and the time period between repetitions.

In step 814, the method provides a receive command ("listen") that receives incoming messages. The receive command may specify a destination port to listen on, may specify a protocol type (including embedded protocol types), may specify a multicast group address for a multicast, may specify a data contents of the packet to be received, etc.

In step 818, the method provides a response command ("trigger rcv from") that recognizes a response requirement in an incoming message and responds by transmitting a response outgoing message. The response command may respond according to a source address contained within the received packet. Additionally, the response command may respond according to a source port number, a protocol type of the incoming packet, a payload, and others.

In use, the emulation language may be used to generate an emulation script composed of one or more of the above commands. The emulation language is for human use and understanding. The emulation script may then be processed in an emulation language compiler that converts the emulation language script into a machine-readable set of instructions and data. The emulation language compiler translates time trigger commands, listen commands, and receive trigger commands, along with any associated command modifiers.

The emulation language of the invention may be used to describe how a node behaves. The emulation language of the invention provides a syntax to specify general packet transmission and reception activity, as well as the details of the characteristics of those activities as related to any applicable communications protocol.

Node emulation functions such as addresses, ports, type of service, precedence, transport protocol, time to live, and multicast addresses capture the protocol features. Node emulation functions such as triggering, repetitions, periodicity, absolute and relative time scales, capture all those features necessary to automate repetitive behavior over some period of time. Node emulation functions such as times, matching, and listening/receiving capture the action/reaction behavior in conjunction with specifying received data and how it is processed. Node emulation functions such as messages and patterns define the payload specifications. Node emulation functions such as embedded protocols capture higher level protocol integration.

Node behavior is defined by the invention through an emulation language syntax and the semantic of emulation language operation in order to define nodes and node behavior. The invention utilizes a protocol stack to generate packets in accordance with the protocol. This gives the node emulator an ability to exchange packets as a standard node. Node behavior is captured because the emulation language enables both the frequency and the compositional aspects of node traffic to be expressed. These key features are paramount in providing the reactive and interactive components of node behavior.

Language

In order to fully emulate node behavior, an emulation language must specify the underlying protocol details of a packet, specify the interactions necessary to exchange packets, and specify the interactions to be experienced by nodes as a result of engaging in a packet exchange. The emulation language of the invention allows for the scripting of traffic scenarios utilizing, for example, TCP/IP stack features in order to specify the underlying protocol details, to specify the interactions necessary to exchange packets, and to specify the interactions to be experienced by nodes. By TCP/IP, it is meant any implementation including a TCP protocol, an IP protocol, a TCP/IP protocol, a UDP protocol, etc.

The emulation language of the invention comprises an event definition, followed by one or more commands and associated modifiers. The command syntax usually comprises a command followed by a number of modifiers.

The emulation language is employed by generating an emulation script. The emulation script may be executed as it is generated (i.e., manually transmitting and receiving packets), or the emulation script may be stored and later executed. In addition, libraries of emulation scripts may be created and used as needed, with particular emulation scripts having particular functions.

The emulation script will preferably lead off with a start command. The start command is optional, and it specifies a time of day in which the emulation script is to be activated. The time is preferably given in hours/minutes/seconds, and preferably in 24-hour military time.

The emulation script may contain, for example, one or more "event for" event definitions. The event definition delineates a new event, with an event being an action taken by the computer or computer device that is executing the emulation script. Therefore, an emulation script may include events such as an outgoing (transmitted) message, a series of outgoing messages, outgoing messages with different source addresses (emulating a plurality of virtual network nodes), receiving an incoming message, and responding to an incoming message by transmitting an outgoing message. It should be understood that the examples and enumerations given are not comprehensive and many numerous valid combinations exist within the constraints of the syntax. Through the emulation script and the events, node behavior may be rigorously emulated.

The "event for <IP address>" syntax denotes an event (specified below the "event for" line) that can occur for the specified address. Therefore, by employing multiple "event for" specifications, the node emulator is capable of including sets of events for many different nodes, with each node being capable of separating out the events that apply to it.

Following an event definition may be three types of commands, a receive ("listen") command, a transmit ("trigger time") command, or a response ("trigger rcv from") command.

A "listen" receive command enables the emulator to listen to (i.e., receive) all incoming packets that meet the listen criteria.

The "trigger time" transmit command may generate an outgoing message upon the occurrence of a specific time. For example, using a "trigger time" transmit command, an emulation script may specify that an outgoing packet be transmitted at a specific time or periodically transmitted, starting at a specific time and repeating at a specified time period.

The "trigger rcv from" response command is a reactive command that may be used to transmit an outgoing packet in response to a received incoming packet.

Each command may be followed by one or more modifiers that specify parameters of an event, such as when the event is to happen, for example. If a parameter of a command is not specified through a modifier, the emulation language will employ a default value. In this manner, the emulation language is easy and economical to use.

Example

Below is an example of an emulation script according to the invention. The example is purely illustrative, and is not exhaustive of the potential types and uses of the commands and modifiers.

---

SAMPLE SCENARIO FILE

```
start 14:30:00
event for 151.190.12.137
    trigger
        time 5000
        repeat 10 period 2, 4, 6, 1
    action
        msg size 256
        send to 151.190.9.11    151.190.9.21
        port 6768
event for 151.190.10.100
    trigger
        rcv from 151.190.9.1
        match *
        repeat 4
    action
        msg "The quick brown fox jumped over the lazy dog!"
        send to 151.190.9.12    151.190.9.13    151.190.49.1
event for 172.24.254.2
    trigger
        time 50
        repeat 10 period 5
    action
        tos 2 prec 8 unicast port 4500 ttl 3
        msg "Hello World"
        send to 172.24.254.50
        port 5634        # destination port number
event for 172.24.254.2
    listen DAT mcast 2300 225.10.10.10
event for 151.190.13.10
    trigger
        rcv from 151.190.9.1
        match "˜hello world$" # will match on "hello world"
        repeat 3
    action
        msg [ protocol info ]
        send to 151.190.9.12    151.190.9.13    151.190.49.1
event for 151.190.1.10
    trigger
        rcv from 151.190.9.*
        match port 53002
```

SAMPLE SCENARIO FILE

```
    repeat 4
action
    msg "Goodby cruel world"
    send to 151.190.1.11   151.190.1.12
```

Emulation Language Syntax

The emulation language depends on a system clock in the node emulator when transmitting on a specified time. Therefore, the system clocks in a network should be synchronized in order for the node emulator to properly implement and use the emulation language.

The emulation language according to the invention preferably is not case or position sensitive. The position and spacing of commands and modifiers in an emulation script is free form as long as the sequence conforms to the emulation language grammar. Specifications of the emulation language grammar are illustrated in the examples below.

Note that any text on a line following the '#' character is considered to be a comment and will be ignored by the emulation language compiler.

| | |
|---|---|
| event for | A pair of words used to denote the beginning of an event definition. Must be followed by an <IP address><br>Example: event for 172.24.254.2 |
| trigger | A keyword denoting the beginning of a trigger specification. There are two types of triggers: time triggers and receive triggers. |

Time trigger syntax:

| | |
|---|---|
| trigger | |
| time | <decimal value (in 100 ms units)> |
| repeat | <decimal value > period <decimal value in 100 ms units)> \| <4 decimal values separated by commas> |

| | |
|---|---|
| Example 1: | trigger<br>time 600<br>repeat 10 period 100 |
| Example 2: | trigger<br>time 5000<br>repeat 6 period 200, 5, 600, 17 |

| | |
|---|---|
| time | Specifies the amount of time (in 100 ms units) to wait before triggering an event. Countdown is begun after the first clock tick is supplied. time 0 is an indication to begin transmission immediately. |
| repeat | Specifies the number of times an event is to be repeated. Counting starts from 0, therefore "repeat 3" results in messages 0, 1, 2, 3 going out, for a total of four messages. This applies to each send address specified. |
| period | The interval (in 100 m units) between repetitions. This can be a single value or a set of 4 values to stagger the repetitions. |

Receive trigger syntax:

```
trigger
rcv from <IP address. Wildcards (*) may be used for any of
the byte values
match *   | <"regular expression">
          | port <integer value in range 1, 025–65, 535>
          | protocol <udp | tcp | mcast>
repeat <decimal value>
```

| | |
|---|---|
| Example 1: | trigger<br>rcv from 151.190.2.129<br>match *<br>repeat 3 |
| Example 2: | trigger<br>rcv from *.*.*.5<br>match "hello world"<br>repeat 0 |
| Example 3: | trigger<br>rcv from 151.190.7.105<br>match port 1234<br>repeat 7 |
| Example 4: | trigger<br>rcv from 148.36.47.*<br>match protocol mcast<br>repeat 0 |

| | |
|---|---|
| rcv from | A pair of words used to denote a receive trigger. Must be followed by an IP address which may have wildcards (*) on any or all of its byte values. This address represents the source IP of the packet that came in. |
| match | A keyword following the rcv from line of a receiver triggers. Must be followed by either a parameter to match on or a wildcard (*) . match currently takes a string parameter (maximum length may be limited to 512 bytes, for example) . The wildcard "*" will match on all strings. The string parameter is a regular expression (a pattern that describes a set of strings) specified between a pair of double quotes. |
| port | An optional keyword following match. It is followed by a number specifying the source port of the message that was received from another specific node as matched by the rcv from keywords (a valid udp port number between 1,025–65,535 should be chosen) . |
| payload | An optional keyword following match. It is followed by a short string that can be either tcp, udp, or mcast. These represent the protocol type of the received packet on which to match. |

Below is a listing and discussion of exemplary regular expressions supported by the emulation language compiler according to one embodiment of the invention. It should be noted that modifications or additions may be made to the emulation language and emulation language compiler as needed in order to accommodate future needs and to accommodate the evolution of the protocols being employed in a network.

| | |
|---|---|
| . | Match any single character except a newline. (e.g. match ".ello world" will match "hello world", "aello world", "bello world", "cello world", etc.) |
| * | Match any number (or none) of the single character that immediately precedes it. The preceding character can |

|   |   |
|---|---|
|   | also be a regular expression, such that .* would mean match any number of any characters.<br>(e.g. match "hel*o"<br>will match "heo", "helo", "hello", "helllo", etc.) |
| + | Matches one or more occurrences of the preceding regular expression<br>(e.g. match "hel+o"<br>will match "helo", "hello", "helllo", etc. but NOT "heo") |
| ? | Matches zero or one occurrences of the preceding regular expression.<br>(e.g. match "hel?o"<br>will match "heo" or "helo", but NOT "hello") |
| ^ | Matches the beginning of a line.<br>(e.g. match "^hello world"<br>will match "hello world", "hello world how are you", etc. but NOT "my hello world") |
| $ | Matches the end of a line.<br>(e.g. match "hello world$"<br>will match "hello world", "my hello world", etc. but NOT "hello world how are you")<br>match "^hello world$"<br>will ONLY match the string "hello world" |
| \ | Take the following character literally (remove any special meaning from the following metacharacter)<br>(e.g. match "hello\?"<br>will match "hello?") |
| [] | Match any one of the enclosed characters. A hyphen (-) indicates a range of consecutive characters, and a circumflex (^) as the first character indicates a match against any character not contained within the brackets. A hyphen or closing bracket as the first character after the opening bracket is treated literally as part of the specified list.<br>(e.g. match "[hm]ello"<br>will match "hello" or "mello") |
| \| | Match either regular expression which precedes or follows this character |
| ( ) | Apply a match to the enclosed group of regular expressions.<br>(e.g. match "((hello) \| (goodbye) world)"<br>will match "hello world" or "goodbye world" |
| action | A keyword denoting the beginning of an action specification. Actions consist of an optional control specification, a message definition, and a transmission list. |

Action specification syntax:

action

In one embodiment, the next 4 lines are optional and all or none of the following control specifications may be used. The ttl option may be used independently of the other options. The other options must be used in conjunction with each other.

```
tos <1, 2, 4, or 8>prec<integer value in range 0–8>
unicast | mcast | sdb | tcp
port <integer value in range 1025–65, 535>
ttl<integer value in range 1–256>
msg     <size <0–512 bytes> > |
        <pattern <decimal value in printable ASCII range
               (33–126)>
        size <0–512> |
        < "A text string" > |
        <{a byte array in hex or decimal}>
        <[embedded protocol information]>
send to <IP address list> |
send to <IP address list> port
            <range 1025–65, 535>
```

|   |   |
|---|---|
| Example 1: | action<br>tos 4 prec 1 unicast<br>port 4500 ttl 3<br>msg "hello"<br>send to    151.190.9.11<br>                151.190.9.21<br>                151.190.9.31 |
| Example 2: | action<br>msg pattern 65 size 200<br>send to 151.122.87.39<br>port 4536 |
| Example 3: | action<br>msg "Hello World"<br>send to    151.190.9.31<br>                151.190.9.41<br>port 5011 |
| Example 4: | action<br>msg { 0xad 0x0d 0xea }<br>send to 151.190.9.255<br>port 5012 |
| Example 5: | action<br>msg [ PROTOKEYWORD protocol info here ]<br>send to 151.223.17.39 |
| tos | An optional network control specification. Allows the user to specify the IP Type of Service for the message. |

| Acceptable values for tos: | |
|---|---|
| 1 | Minimize Monetary Cost |
| 2 | Maximize Reliability |
| 4 | Maximize throughput (suggested default) |
| 8 | Minimize Delay | prec—An optional network control specification. Allows the user to specify the Precedence for the message. Acceptable values for prec are in the range 0–7. (The ability exists to perform a protocol or application-specific mapping of precedence values to the 8 currently available values of the TCP/IP protocol.)

| IP TOS Precedence Mappings | |
|---|---|
| 0 | Routine (suggested default) |
| 1 | Priority |
| 2 | Immediate |
| 3 | Flash |
| 4 | Flash Override |
| 5 | CRITIC/ECP |
| 6 | Internetwork Control |
| 7 | Network Control | unicast—An optional network control specification. Specifies that the transmission is to be unicast. Alternate types of transmission are selective directed broadcast, multicast, and tcp. Unicast is the default value.

sdb—An optional network control specification that specifies that the transmission is to be selective directed broadcast (many addresses in a single packet).

mcast—An optional network control specification that specifies that the transmission is to be multicast (the message is capable of being received by all nodes on a network that subscribe to the corresponding multicast group address contained within the destination address field of the packet).

tcp—An optional network control specification that specifies that the transmission is to be TCP.

port—An optional network control specification that specifies the source UDP port. Must be followed by a valid UDP port number (recommended range: 1025–65, 535). Using the optional port definition will cause all datagrams associated with the event to be transmitted from the specified port, overriding the default port for that event. If no port definition is given, it defaults to 0. If the tos line is omitted, the source value defaults to 0. If the tos line is given, but the user does not want to specify the source port, a 0 should be used as the parameter to port.

ttl—An optional network control specification. Allows the user to specify the time to live for the message. The range of this value is 1–256. If no ttl is specified, the default value may be 20.

msg—A required parameter of an action specification. This is followed by:

| text string<br>byte array | msg "Hello World" |
|---|---|
| (hex) | msg { 0xac 0x0d 0xea 0xoe } |
| (decimal) | msg { 172 13 234 206 } |
| data pattern | msg pattern 65 size 200 |
| embedded protocol | msg [protocol info here] |

Any contents within the brackets of an embedded protocol will be treated as protocol information and will not be interpreted.

If a user specifies the embedded protocol brackets [ ], the user is expected to specify a protocol keyword after the opening bracket. The protocol keywords may include, for example, TXT, DAT, BIN and VMF. The "TXT" and "BIN" keywords do not result in any analyzable log-data being recorded (the data recorded can only be used for simple completion confirmation). The use of "DAT" and "VMF" keywords will result in valid log-data being recorded. These logfiles can then be fed into a post-test analysis tool to determine necessary network performance metrics.

The use of the "BIN" keyword is special and the embedded protocol format uses the BIN keyword with the binary message specified between double quotes as two-byte, colon-separated, hexadecimal characters. All other max buffer size restrictions apply. In use, for example, the BIN keyword may be used as: msg [BIN "af:00:b5:c3"]

The use of the protocol keywords in the embodiment above shows case-sensitivity. In this embodiment only capital letters should be used when specifying protocol keywords on the listen and other events. In general, the use of capital keywords also makes it easier to highlight differences among the events.

| pattern | A keyword that can be used to set the data in a message to a user specified value<br>(e.g. msg  pattern 65  size 200<br>will set all 200 bytes of data to decimal value 65,<br>which is an ASCII character 'A') |
|---|---|

If the size parameter is set to 0, the length of the pattern will be randomly generated (between 1 and the maximum data size). For randomly generated lengths OR fixed size lengths, each time the message repeats, the "pattern" character is advanced to the next ASCII value. Any time the pattern keyword is used, subsequent transmissions will increment the ASCII payload value.

For example:

```
repeat 2
action
msg pattern 65 size 200
``` will set all 200 bytes of data to decimal value 65 (the ASCII character 'A') for the first message, all 200 bytes of data to decimal value 66 (ASCII character 'B') for the second message, and all 200 bytes of data to decimal value 67 (ASCII character 'C') for the third message.

size—A keyword that specifies the number of bytes of data that a message will contain. The maximum data size may be, for example, 512 bytes, and if a data size larger than 512 is specified, the data may be truncated to 512 bytes. If the size parameter is set to 0, the length of the message pattern will be a random number in the range of 1–512.

Example:

| msg pattern 65 size 100 | (this will be transmitted as 100 bytes of pattern data) |
|---|---| send to—A pair of words used to denote the beginning of a transmission list of an action specification. May be limited to a predetermined maximum number of destination IP addresses.

port—An optional keyword following send to <IP address list>. It is followed by a number specifying the destination port the message is being sent to (a valid UDP port number between 1025–65, 535 should be chosen.)

start—An optional time specification which sets a time of day when the emulation script is to start. This command is only allowed at the start of a emulation script prior to any other specifications. The start time is only valid during the current day and it is only possible to set a start time between the current time and midnight. Syntax: start hh:mmm:ss where hh=hour (military) mm=minute and ss=second.

(example: start 16:45:30)

listen—A keyword denoting the beginning of a listen specification. May be followed by a payload, the type of listen (UDP, TCP, or multicast), and a valid port number.

Listen specification syntax:

| listen | <payload (max length = 25 bytes)*><br>udp \| tcp \| mcast<br><port (in range 1025–65, 535)><br><OPTIONAL group value IP address for mcast> |
|---|---|

| Example 1: | listen VMF udp 5500 |
|---|---|
| Example 2: | listen DAT mcast 5500 225.10.10.10 |
|  | listen BIN mcast 5501 225.11.11.11 |
| Example 3: | listen DAT  tcp 3452 |

The payload is a short string that must be specified after the listen keyword. It associates the type of data that will be listened to on that port. If no particular payload type is to be specified, the user should put the word "TXT" after the listen keyword. Valid payload types are not dictated by the emulation language compiler, and are network-driver implementation-dependent string values.

udp—keyword specifying the opening of a udp socket. Must be followed by a valid port number.

tcp—keyword specifying the opening of a tcp socket. Must be followed by a valid port number.

mcast—keyword specifying the opening of a mcast socket. Must be followed by a valid port number and a multicast group value IP address. In one embodiment, a unique multicast address must be mapped to a unique port number.

While the invention has been described in detail above, the invention is not intended to be limited to the specific embodiments as described. It is evident that those skilled in the art may now make numerous uses and modifications of and departures from the specific embodiments described herein without departing from the inventive concepts.

The invention claimed is:

1. A node emulator for conducting network testing by emulating node behavior in at least one node of a network comprising a plurality of nodes, the node emulator comprising:
   a node interface operable to generate an emulation script representing behavior of an emulated network node that is a virtual node, the node interface being employed by the at least one network node as a result of communication between the at least one network node and the node emulator, wherein the node emulator is operable to process the emulation script to conduct interactions with the at least one node;
   a memory operable to store the emulation script; and
   a CPU operable to control the node emulator.

2. The node emulator of claim 1, wherein the memory additionally stores instructions representing a network node emulation language.

3. The node emulator of claim 2, wherein the memory further stores information representing a protocol stack.

4. The node emulator of claim 2, wherein the memory further stores information representing an emulation language compiler.

5. The node emulator of claim 1, further including at least one I/O device.

6. The node emulator of claim 1, wherein the CPU of said node emulator generates for transmission an outgoing message that includes a non-existent source address to thereby emulate a network environment by creating a plurality of virtual nodes each corresponding to a non-existent source address, and said CPU of said node emulator processes received messages intended for said virtual nodes and generates response outgoing messages so as to emulate interactivity of said virtual nodes with a network node.

7. The node emulator of claim 1, wherein the emulation script includes information relating to specifying protocol characteristics of a packet exchange, and specifying node interactions in order to exchange packets.

8. The node emulator of claim 1, wherein the memory additionally stores the network node emulation language.

9. A computer-implemented method of generating an emulated network node in a distributed electronic network, comprising:
   processing an emulation script at a network emulator to determine the emulated network node behavior, said emulation script comprising a trigger command that is responsive to determining a match between a payload of a received incoming message and at least one of: a particular string parameter and a wildcard;
   receiving an incoming message based on the emulation script at the emulated network node; and
   recognizing a response requirement in said incoming message and responding to said incoming message by transmitting a response outgoing message in response to determining that the incoming message includes a response requirement.

10. The method of claim 9, wherein said outgoing and incoming messages comprise data packets.

11. The method of claim 9, wherein said method is used to emulate a network behavior.

12. The method of claim 9, wherein processing comprises processing said emulation script that further specifies a predetermined type of service.

13. The method of claim 9, wherein processing comprises processing said emulation script that further specifies a message precedence.

14. The method of claim 9, wherein processing comprises processing said emulation script that further specifies a protocol layer for use in transmitting the response outgoing message.

15. The method of claim 9, wherein responding comprises transmitting said outgoing message to a predetermined unicast network address.

16. The method of claim 9, wherein responding comprises transmitting said outgoing message to a predetermined multicast address.

17. The method of claim 9, wherein responding comprises transmitting said outgoing message to predetermined selective directed broadcast addresses.

18. The method of claim 9, wherein said incoming message includes a predetermined network address.

19. The method of claim 9, wherein said incoming message includes a predetermined network address and port.

20. The method of claim 9, wherein said incoming message includes a predetermined source port.

21. The method of claim 9, wherein said incoming message is formatted according to a predetermined protocol type.

22. The method of claim 9, wherein said incoming message includes a predetermined payload.

23. The method of claim 9, wherein said outgoing message is specified by a computer program and in a form dictated by an emulation language.

24. The method of claim 9, wherein said outgoing message is specified by a manual operator and in a form dictated by an emulation language.

25. The method of claim 9, wherein said response outgoing message is specified in a computer program and in a form dictated by an emulation language.

26. The method of claim 9, wherein said response outgoing message is specified by a manual operator and in a form dictated by an emulation language.

27. The method of claim 9, and further comprising specifying a time to live for said outgoing message.

28. The method of claim 9, wherein said emulation script comprises a listening mode of said emulated network node, said listening mode determining whether an incoming message will be received by said emulated network node.

29. The method of claim 9, wherein recognizing further comprises including a predetermined data pattern in said outgoing message.

30. The method of claim 9, wherein recognizing comprises comparing a source address in an incoming message to a predetermined set of source addresses and transmits a response outgoing message if said source address in said incoming message is matched.

31. The method of claim 9, wherein recognizing comprises comparing a protocol type in an incoming message to a predetermined protocol type and transmits a response outgoing message if said protocol type of said incoming message is matched.

32. The method of claim 9, wherein recognizing comprises comparing a source port in an incoming message to a predetermined source port and transmits a response outgoing message if said source port in said incoming message is matched.

33. The method of claim 9, wherein recognizing comprises comparing a regular expression in an incoming message to a predetermined regular expression and transmits a response outgoing message if said regular expression in said incoming message matches said predetermined regular expression.

34. The method of claim 9, wherein said method generates a virtual node by transmitting an outgoing message containing a non-existent source address.

35. The method as claimed in claim 9, wherein said receiving step further comprises communicating with a protocol transport layer via encapsulation so as to be independent of a packet structure.

36. A computer-implemented method for emulating a node of a data network, comprising:
  (a) specifying a predetermined set of interactions to be experienced by at least one network node as a result of exchanging messages between the at least one network node and a virtual node emulator, said set of interactions including a receive command, transmit command and response command, protocol characteristics of a message exchange, and node interactions necessary to exchange messages;
  (b) receiving an incoming message at the virtual node emulator from the data network and processing said incoming message according to parameters of a receive command;
  (c) generating an outgoing message according to parameters of a transmit command and transmitting said outgoing message from the virtual node emulator to a node in the data network or to a solitary node connected to the node emulator;
  (d) responding to an incoming message at the virtual node emulator by transmitting a response outgoing message according to parameters of a response command;
  wherein said (b) receiving, (c) transmitting and (d) responding being executed independently of each other at any time such that the virtual node emulator may be transmitting a message while also receiving or responding to a message, and such that the virtual node emulator may be receiving a first incoming message while responding to a second incoming message.

37. The method of claim 36, wherein said (a) specifying comprises specifying a predetermined trigger event that causes transmission of a corresponding predetermined outgoing message.

38. The method of claim 36, wherein said (a) specifying comprises specifying specifies a pseudo random repetition time period of a periodically transmitted outgoing message.

39. The method of claim 36, wherein (b) receiving comprises receiving an incoming message from another node emulator, and (c) generating comprises generating an outgoing message to said other node emulator.

40. A computer-implemented method of generating an emulated network node in a distributed electronic network, comprising:
  receiving an incoming message from the network at the emulated network virtual node;
  evaluating a payload of the incoming message with a regular expression to generate a true or false result, wherein a true result indicates that the payload contains enough components that are matched according to rules of regular expressions.

41. The method of claim 40, and further comprising executing an event in response said evaluating produced a true result, said executing comprising transmitting one or more outgoing messages, each outgoing message with the same or different source address.

42. A method for addressing a group of emulated virtual nodes by specifying a group of member nodes within a network of nodes, said method comprising the steps of:
  generating a message to a plurality of the specified group;
  receiving the message at a master node, wherein the master node is within the plurality of the specified group;
  polling the plurality of said specified group by the master node; and
  selecting at least one of the specified group to deliver said message.

* * * * *

UNITED STATES PATENT AND TRADEMARK OFFICE
CERTIFICATE OF CORRECTION

PATENT NO. : 7,596,484 B1  Page 1 of 1
APPLICATION NO. : 09/711898
DATED : September 29, 2009
INVENTOR(S) : Patel et al.

It is certified that error appears in the above-identified patent and that said Letters Patent is hereby corrected as shown below:

Column 15, line 49, replace "tt1" with -- ttl --.

Signed and Sealed this

Twenty-fourth Day of November, 2009

David J. Kappos
*Director of the United States Patent and Trademark Office*